US011462992B2

(12) United States Patent
Ramirez Sanchez et al.

(10) Patent No.: US 11,462,992 B2
(45) Date of Patent: Oct. 4, 2022

(54) SYSTEM AND METHOD FOR OPERATING A POWER GENERATING ASSET

(71) Applicant: General Electric Company, Schenectady, NY (US)

(72) Inventors: Fernando Arturo Ramirez Sanchez, Salem, VA (US); Igor Berroteran, Salem, VA (US); Victor Eduardo Tamez Varela, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 87 days.

(21) Appl. No.: 17/137,929

(22) Filed: Dec. 30, 2020

(65) Prior Publication Data

US 2022/0209649 A1 Jun. 30, 2022

(51) Int. Cl.
*H02M 5/458* (2006.01)
*H02M 1/36* (2007.01)
*F03D 9/25* (2016.01)

(52) U.S. Cl.
CPC .............. *H02M 1/36* (2013.01); *F03D 9/257* (2017.02); *H02M 5/458* (2013.01)

(58) Field of Classification Search
CPC ........ H02M 1/36; H02M 5/453; H02M 5/458; H02J 3/386; H02J 3/42; F03D 9/257
See application file for complete search history.

(56) References Cited

U.S. PATENT DOCUMENTS

| 7,656,117 | B2 | 2/2010 | Hoadley et al. |
| 8,605,469 | B2 | 12/2013 | Swamy |
| 9,654,028 | B1 * | 5/2017 | Luo ........................ H02M 7/537 |
| 9,837,924 | B1 | 12/2017 | Wei et al. |
| 10,590,914 | B2 | 3/2020 | Abeyasekera et al. |
| 2008/0298097 | A1 | 12/2008 | Hoadley et al. |
| 2009/0027824 | A1 | 1/2009 | Allen et al. |
| 2010/0111706 | A1 | 5/2010 | Abraham |
| 2011/0106470 | A1 | 5/2011 | Yin et al. |
| 2013/0235629 | A1 | 9/2013 | Zhan et al. |
| 2013/0289911 | A1 | 10/2013 | Patel et al. |
| 2014/0056041 | A1 | 2/2014 | Zhu et al. |
| 2015/0077067 | A1 | 3/2015 | Kanjiya et al. |
| 2015/0309119 | A1 | 10/2015 | Berroteran Gil et al. |
| 2015/0309123 | A1 | 10/2015 | Berroteran Gil et al. |

(Continued)

*Primary Examiner* — Gary L Laxton
(74) *Attorney, Agent, or Firm* — Dority & Manning, P.A.

(57) ABSTRACT

A system and method are provided for operating a power generating asset electrically coupled to a power grid. The power generating asset includes a power converter having a line-side converter operably coupled to the power grid via a converter contactor. Accordingly, a line-side converter of the power converter is decoupled from the power grid and a controller determines the phase angle of the grid voltage. A switching sequence for a plurality switching devices of the line-side converter is then set in order to develop a pre-charge voltage phase angle at a converter-side terminal of the converter contactor which is in phase with the phase angle of the grid voltage. A portion of the charge of the DC link is then discharged through the line-side converter to develop a pre-charge voltage at the converter-side terminal. Once the in-phase, pre-charge voltage is established at the converter-side terminal, the converter contactor is closed to re-couple the line-side converter to the power grid.

20 Claims, 5 Drawing Sheets

(56) References Cited

U.S. PATENT DOCUMENTS

| | | |
|---|---|---|
| 2016/0102653 A1 | 4/2016 | Barton et al. |
| 2016/0126858 A1 | 5/2016 | Wu et al. |
| 2016/0172963 A1 | 6/2016 | Gopinath et al. |
| 2018/0069404 A1 | 3/2018 | Schult et al. |
| 2018/0112647 A1 | 4/2018 | Abeysekera et al. |
| 2018/0112648 A1* | 4/2018 | Bond .................... H02K 47/04 |
| 2018/0254628 A1* | 9/2018 | Schelenz ................ H02J 3/382 |
| 2019/0376489 A1 | 12/2019 | Holliday et al. |
| 2020/0102935 A1* | 4/2020 | Casal Vilana ............ F03D 9/11 |

* cited by examiner

SYSTEM AND METHOD FOR OPERATING A POWER GENERATING ASSET

FIELD

The present disclosure relates in general to power generating assets, and more particularly to systems and methods for operating power generating assets so as to preclude an in-rush current across a contactor when the power generating asset is coupled to a power grid.

BACKGROUND

As disclosed herein, power generating assets may take a variety of forms and may include power generating assets which rely on renewable and/or nonrenewable sources of energy. Those power generating assets which rely on renewable sources of energy may generally be considered one of the cleanest, most environmentally friendly energy sources presently available. For example, wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple wind turbine generators that are operable to supply power to a transmission system providing power to a power grid.

In many wind turbines, the generator may be electrically coupled to a bi-directional power converter that includes a rotor-side converter joined to a line-side converter via a regulated direct current (DC) link. As such, the generator is configured to convert the rotational mechanical energy to a sinusoidal, three-phase alternating current (AC) electrical energy signal in a generator stator. The rotational energy is converted into electrical energy through electromagnetic fields coupling the rotor and the stator, which is supplied to a power grid via a grid breaker. Typically, the main transformer steps up the voltage amplitude of the electrical power such that the transformed electrical power may be further transmitted to the power grid.

Such wind turbine power systems are generally referred to as a doubly-fed induction generator (DFIG). DFIG operation is typically characterized in that the rotor circuit is supplied with current from the power grid via a current-regulated power converter. As such, the wind turbine produces variable mechanical torque due to variable wind speeds and the power converter ensures this torque is converted into an electrical output at the same frequency of the grid. Wind turbines (and solar converters) also often have capacitance built into the AC interface. For example, such capacitance may be part of a filter to ensure power quality (e.g. limited harmonics) of the power system.

Often, the power converter is operably coupled to the power grid via a converter contactor, and when the power generating asset is parked and/or idled, the converter contactor may be opened to decouple the DFIG from the power grid. When opened, one terminal of the converter contactor may remain energized by power from the power grid while the opposing terminal may be deenergized. During startup, the converter contactor is often closed to connect the system to the power grid. However, as the contacts of the converter contactor approach the closed position, there can be an inrush of current which may arc across the contacts of the contactor. This arcing may result in the degradation of the converter contactor. For example, the arcing may result in an increase in the resistance of the contactor due to physical damage to the contact surfaces and/or the formation of corrosion products (e.g., oxides, chlorides, sulfides, nitrides, and carbon) on the surface of the contacts.

Thus, the present disclosure is directed to a system and method for minimizing inrush of current during start-up of an electrical power system connected to a power grid to address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for operating a power generating asset electrically coupled to a power grid. The power generating asset may include a power converter having a line-side converter operably coupled to the power grid via a converter contactor. The method may include decoupling the line-side converter from the power grid and determining, via a controller, a phase angle of a grid voltage of the power grid. The method may also include determining, via the controller, a switching sequence for a plurality of switching devices of the line-side converter. The switching sequence may be configured to develop a pre-charge voltage phase angle at a converter-side terminal of the converter contactor. Additionally, the method may include discharging a portion of a charge of a DC link through the line-side converter implementing the switching sequence. The discharging of the portion of the charge through the switching sequence may develop a pre-charge voltage having the pre-charge voltage phase angle at the converter-side terminal. The pre-charge voltage phase angle may be in phase with the phase angle of the grid voltage. The method may also include closing the converter contactor so as to recouple the line-side converter to the power grid.

In an embodiment, the converter contactor may include a grid-side terminal energized by the grid voltage. Additionally, developing the pre-charge voltage may energize the converter-side terminal so as to preclude an inrush current across the converter contactor when closed.

In an additional embodiment, developing the pre-charge voltage at the line-side terminal may include developing the pre-charge voltage within a filter module coupled between the line-side converter and the converter contactor.

In a further embodiment, determining the phase angle of the grid voltage may include receiving data indicative of the phase angle of the grid voltage from a phase-locked-loop module. Additionally, determining the switching sequence may include determining, via the controller, a target pre-charge voltage magnitude at the converter-side terminal. The method may also include monitoring, via the controller, a magnitude of the charge of the DC link. Furthermore, the method may include determining, via the controller, the switching sequence based on the data indicative of the phase angle of the grid voltage, the pre-charge voltage magnitude at the converter-side terminal, and the magnitude of the charge of the DC link.

In yet a further embodiment, determining the switching sequence may include determining, via the controller, a filter phase delay for the filter module. Additionally, the method may include modifying the switching sequence to advance the phase angle of the pre-charge voltage to compensate for the filter phase delay.

In an embodiment, the plurality of line-side converter elements may include three pairs of diodes and three pairs of insulated-gate bipolar transistors.

In an additional embodiment, developing the pre-charge voltage at the converter-side terminal may include determining, via the controller, a voltage magnitude of the grid voltage. Additionally, the method may include developing a pre-charge voltage via a ramping of the pre-charge voltage from a zero magnitude to a magnitude which is within a deviation limit relative to the grid voltage.

In a further embodiment, ramping the pre-charge voltage magnitude comprises developing the pre-charge voltage which is at least 85% of the voltage magnitude of the grid voltage.

In yet a further embodiment, developing the pre-charge voltage includes monitoring, via the controller, a magnitude of the portion of the DC-link charge passed through the line-side converter. Additionally, the controller may calculate the pre-charge voltage magnitude at the converter-side terminal based, at least in part, on the monitored magnitude of the portion of the DC-link charge passed through the line-side converter.

In an embodiment, developing the pre-charge voltage at the converter-side terminal may include determining, via the controller, a filter impedance for a filter module disposed between the line-side converter and the converter contactor. Additionally, the method may include shaping the discharged portion of the DC-link charge based, at least in part, on the filter impedance so as to develop the pre-charge voltage at the converter-side terminal that is in phase with the grid voltage and within the deviation limit.

In an additional embodiment, the power converter may include a distortion filter operably coupling the filter module to the line-side converter. The portion of the DC-link charge discharged through the line-side converter may be passed through the distortion filter and then to the filter module.

In a further embodiment, the method may include monitoring, via the controller, a non-discharged portion of the DC-link charge retained by a DC link of the power converter. The method may also include detecting, via the controller, an approach of the non-discharged portion to a minimum charge threshold. Additionally, the method may include halting the discharging of the portion of the DC-link charge when the non-discharge portion is below the minimum charge threshold.

In yet a further embodiment, the decoupling of the line-side converter may be accomplished in response to at least one of a parking or idling of the power generating asset.

In another aspect, the present disclosure is directed to a system for operating a power generating asset connected to a power grid. The system may include a power converter having a line-side converter operably coupled to a power grid via a converter contactor, and a controller communicatively coupled to the power converter. The controller may include at least one processor configured to perform a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
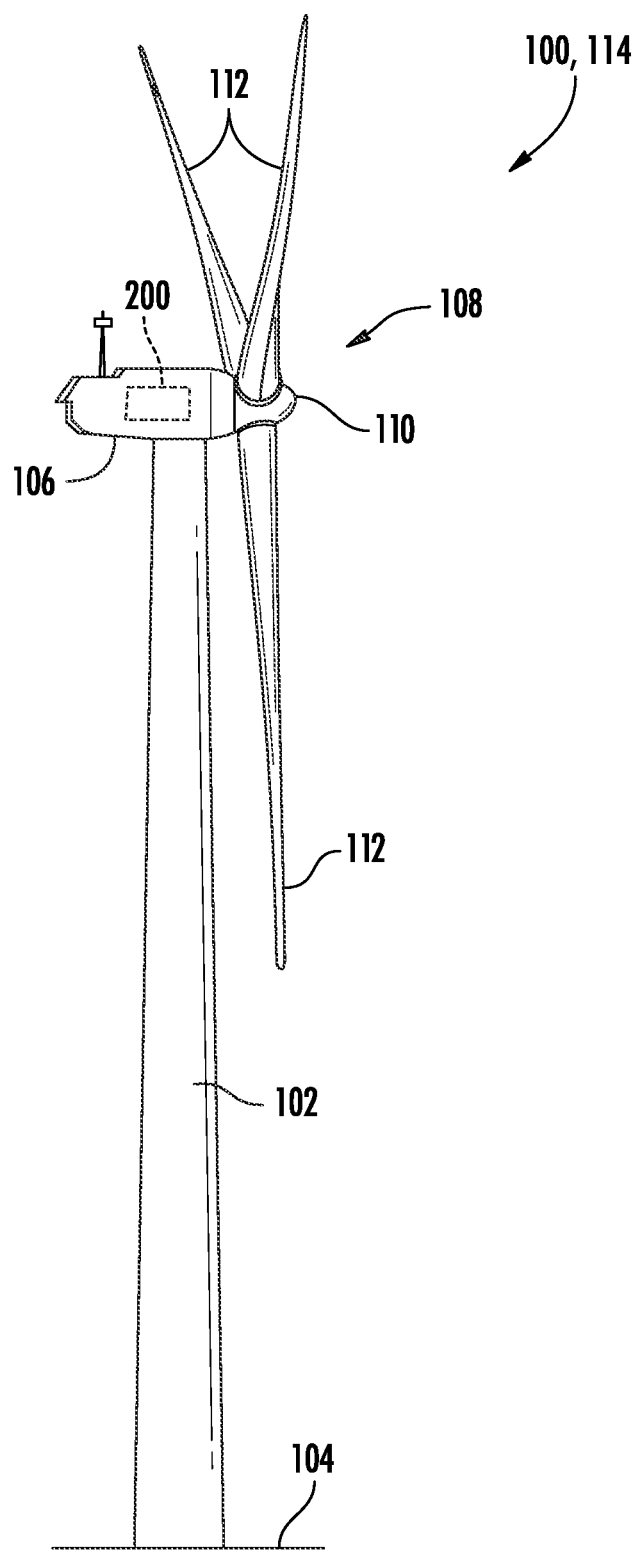
FIG. 1 illustrates a perspective view of one embodiment of a power generating asset configured as a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for operating a power generating asset, such as a wind turbine. The power generating asset may include a power converter. The power converter may be operably coupled to the power grid via a converter contactor positioned between a line-side converter and the power grid. The converter contactor may include a grid-side terminal and a converter-side terminal. When the power converter is coupled to the power grid, such as when the power generating asset is in a power generating operating state, power may flow from the power grid and across the terminals of the closed converter contactor. However, whenever the converter contactor is opened to decouple the power converter from the power grid, the grid-side terminal may remain energized by the power grid while the converter-side terminal may be deenergized. As such, when the energized grid-side terminal is electrically coupled to the deenergized converter-side terminal via the closing of the converter contactor, a transient inrush current may be developed across the terminals. This inrush current may result in electrical arcing as the contacts are brought into proximity with one another. Since such arcing may result in the degradation of the converter contactor, it may be desirable to limit the degradation by precluding the development of the inrush current when coupling/re-coupling the power converter to the power grid.

In order to preclude the inrush current, the systems and methods of the present disclosure may develop a pre-charge voltage which energizes the converter-side terminal prior to the closing of the converter contactor. Specifically, following the decoupling of the line-side converter from the power grid, such as in response to the idling and/or parking of a wind turbine, a controller of the power generating asset may determine a phase angle of the grid voltage. The controller may then determine a switching sequence for a plurality of switching devices of the line-side converter. The switching sequence may be a specific sequence computed to transform a DC voltage input into an AC voltage output which is in phase, when delivered to the converter-side terminal of the converter contactor, with the phase angle of the grid voltage. In other words, the various combinations of operating states of the plurality switching devices and the amount of time between operating state transitions for each of the switching devices may employed to shape the AC voltage output.

Following the determination of the switching sequence necessary to develop the pre-charge voltage phase angle at the converter-side terminal of the converter contactor, the controller may discharge a portion of a DC charge stored in a DC link through the line-side converter implementing the switching sequence. By discharging the DC-link charge through the line-side converter, a pre-charge voltage having a pre-charge voltage phase angle in phase with the grid voltage may be developed at the converter-side terminal. As such, both the grid-side terminal and the converter-side terminal may both be energized while the converter contactor remains in the open position. With both terminals energized, the converter contactor may be closed to couple/re-couple the line-side converter to the power grid without an inrush current developing across the terminals.

Precluding the development of the inrush current via the establishment of the in-phase pre-charge voltage may reduce the stress and wear placed on the components of the power converter. For example, precluding the arcing which may occur as the contacts of the contactor are brought into proximity with one another may preserve the conductivity of the contacts. This may be achieved by the reduction/elimination erosion of the contacts and/or the buildup of corrosion products thereon resulting from the arcing.

Referring now to the drawings, FIG. 1 illustrates a perspective view of one embodiment of a power generating asset 100 according to the present disclosure. As shown, the power generating asset 100 may be configured as a wind turbine 114. In an additional embodiment, the power generating asset 100 may, for example, be configured as a solar power generating asset, a hydroelectric plant, a fossil fuel generator, and/or a hybrid power generating asset.

When configured as a wind turbine 114, the power generating asset 100 may generally include a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 400 (FIG. 2) positioned within the nacelle 106 to permit electrical energy to be produced.

The wind turbine 114 may also include a controller 200 centralized within the nacelle 106. However, in other embodiments, the controller 200 may be located within any other component of the wind turbine 114 or at a location outside the wind turbine. Further, the controller 200 may be communicatively coupled to any number of the components of the wind turbine 114 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
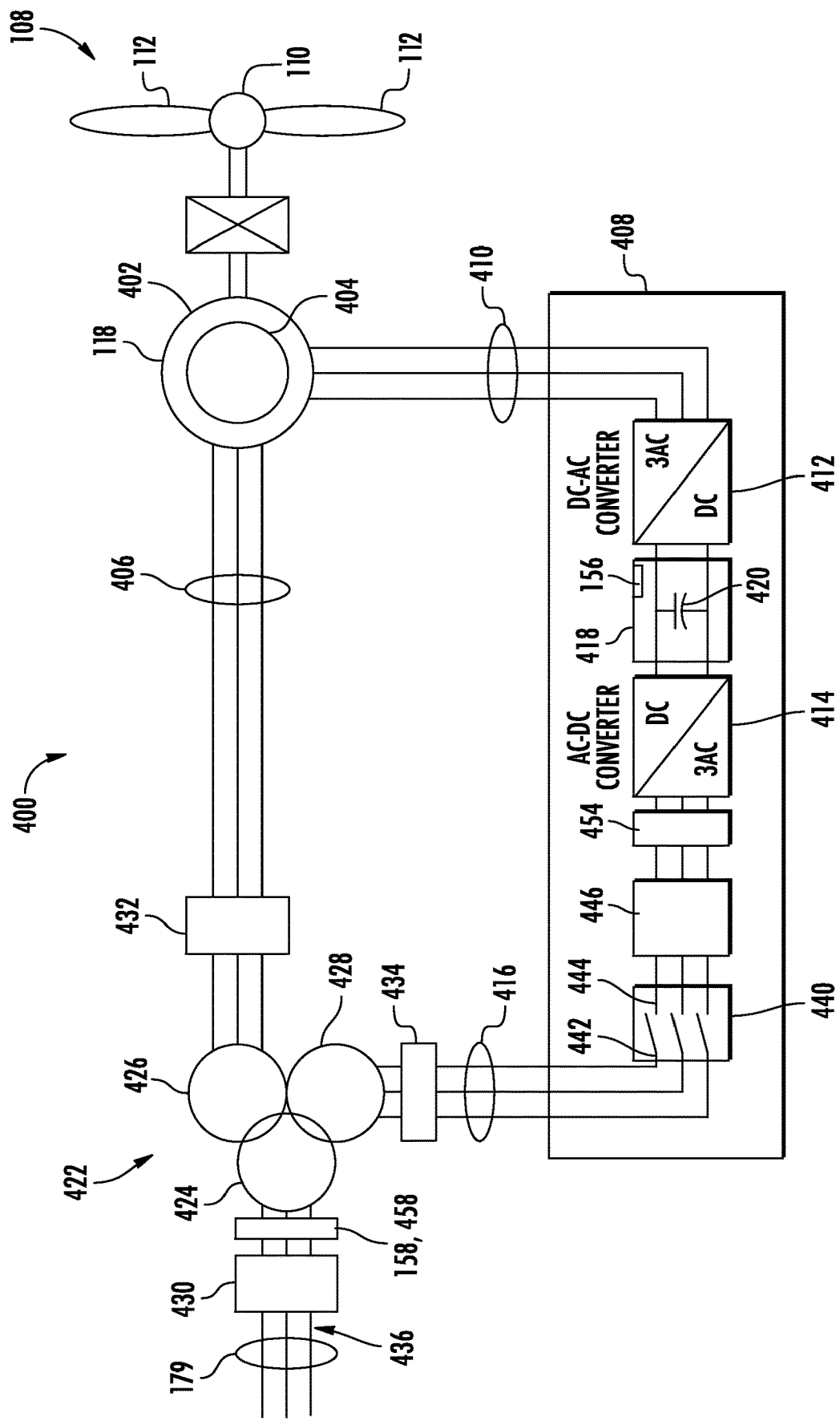
FIG. 2 illustrates a schematic diagram of one embodiment of an electrical system for use with the power generating asset according to the present disclosure.
Figure 3:
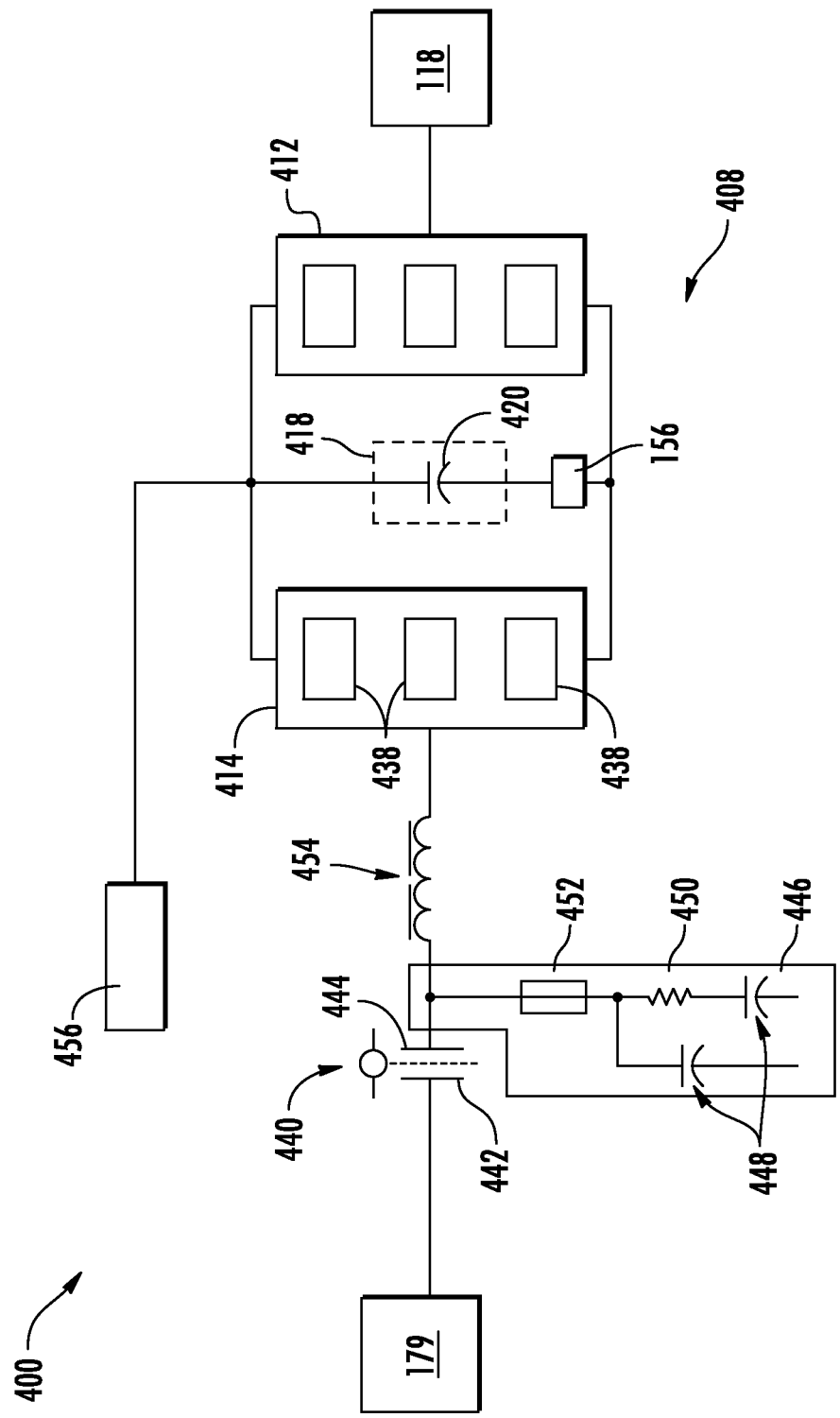
FIG. 3 illustrates a schematic diagram of a portion of the electrical system of FIG. 2 according to the present disclosure.

Referring now to FIGS. 2 and 3, exemplary electrical system 400 of the power generating asset 100 is illustrated. As shown, the generator 118 may be coupled to the rotor 108 for producing electrical power from the rotational energy generated by the rotor 108. Accordingly, in an embodiment, the electrical system 400 may include various components for converting the kinetic energy of the rotor 108 into an electrical output in an acceptable form to a connected power grid 179. For example, in an embodiment, the generator 118 may be a doubly-fed induction generator (DFIG) having a stator 402 and a generator rotor 404. The generator 118 may be coupled to a stator bus 406 and a power converter 408 via a rotor bus 410. In such a configuration, the stator bus 406 may provide an output multiphase power (e.g. three-phase power) from a stator of the generator 118, and the rotor bus 410 may provide an output multiphase power (e.g. three-phase power) of the generator rotor 404 of the generator 118.

Additionally, the generator 118 may be coupled via the rotor bus 410 to a rotor side converter 412. The rotor side converter 412 may be coupled to a line-side converter 414 which, in turn, may be coupled to a line-side bus 416.

In an embodiment, the rotor side converter 412 and the line-side converter 414 may be configured for normal operating mode in a three-phase, pulse width modulation (PWM) arrangement using insulated gate bipolar transistors (IGBTs) as switching devices 438. Other suitable switching devices may be used, such as insulated gate commuted thyristors, MOSFETs, bipolar transistors, silicone controlled rectifier's, and/or other suitable switching devices. The rotor side converter 412 and the line-side converter 414 may be coupled via a DC link 418 across a DC link capacitor 420. For example, in an embodiment in accordance with the present disclosure, the line-side converter 414 may include three pairs of IGBTs and three corresponding pairs of diodes which may be employed to transform a DC input into an AC output having a desired phase angle.

In an embodiment, the power converter 408 may be coupled to the controller 200 configured as a converter controller 202 to control the operation of the power converter 408. For example, the converter controller 202 may send control commands to the rotor side converter 412 and the line-side converter 414 to control the modulation of switching elements used in the power converter 408 to establish a desired generator torque setpoint and/or power output.

As further depicted in FIG. 2, the electrical system 400 may, in an embodiment, include a transformer 422 coupling the power generating asset of 100 to the power grid 179 via a point of interconnect (POI) 436. The transformer 422 may, in an embodiment, be a 3-winding transformer which includes a high voltage (e.g. greater than 12 KVAC) primary winding 424. The high voltage primary winding 424 may be coupled to the power grid 179. The transformer 422 may also include a medium voltage (e.g. 6 KVAC) secondary winding 426 coupled to the stator bus 406 and a low voltage (e.g. 575 VAC, 690 VAC, etc.) auxiliary winding 428 coupled to the line-side bus 416. It should be appreciated that the transformer 422 can be a three-winding transformer as depicted, or alternatively, may be a two-winding transformer having only a primary winding 424 and a secondary winding 426; may be a four-winding transformer having a primary winding 424, a secondary winding 426, and auxiliary winding 428, and an additional auxiliary winding; or may have any other suitable number of windings.

In an embodiment, the electrical system 400 may include various protective features (e.g. circuit breakers, fuses, contactors, and other devices) to control and/or protect the various components of the electrical system 400. For example, the electrical system 400 may, in an embodiment, include a grid circuit breaker 430, a stator bus circuit breaker 432, and/or a line-side bus circuit breaker 434. The circuit breaker(s) 430, 432, 434 of the electrical system 400 may connect or disconnect corresponding components of the electrical system 400 when a condition of the electrical system 400 approaches a threshold (e.g. a current threshold and/or an operational threshold) of the electrical system 400.

Referring again to FIGS. 2 and 3, in an embodiment, the line-side converter 414 of the power converter 408 may be coupled to the power grid 179 via a converter contactor 440. The converter contactor 440 may have an open operating state/configuration, wherein the converter contactor 440 may be nonconductive, and a closed operating state/configuration, wherein the converter contactor 440 may be conductive. For example, the converter contactor 440 may include at least one pair of contacts which may be brought into contact with one another to establish the closed operating state and may be separated from one another to establish the open operating state. In an embodiment, the converter contactor 440 may include at least one grid-side terminal 442. The grid-side terminal(s) 442 may be energized by voltage from the power grid 179 in both the open and closed configurations. In an embodiment, the converter contactor 440 may also include at least one converter-side terminal 444. The converter-side terminal(s) 444 may be electrically decoupled from the power grid 179 when the converter contactor 440 is in an open configuration. It should be appreciated that, in an embodiment, the converter contactor 440 may be an integral component of the power converter 408.

In an embodiment, the electrical system 400 may include a filter module 446 disposed between the line-side converter 414 and the converter contactor 440 the filter module may, in an embodiment, be an AC filter configured to limit a harmonic attribute of the grid voltage. In an embodiment, the filter module 446 may include a at least one capacitor 448, at least one resistive element 450 and/or a filter fuse 452. The elements 448, 450, 452 of the filter module 446 may be configured to receive and shape the grid voltage when the converter contactor 440 is in the closed position prior to delivery to the line-side converter 414.

In an additional embodiment, the electrical system 400 may also include a distortion filter 454 positioned between the converter contactor 414 and the line-side converter 414. For example, in an embodiment, the distortion filter 454 may be an inductive element positioned in-line between the filter module 446 and the line-side converter 414. In such an embodiment, the distortion filter 454 may be configured to further shape/condition the grid voltage prior to delivery to the line-side converter 414.

As further depicted in FIGS. 2 and 3, in an embodiment, the power generating asset 100 may include at least one operational sensor 156. The operational sensor(s) 156 may be configured to detect a performance of the power generating asset 100, e.g. in response to the environmental condition. In an embodiment, the operational sensor(s) 156 may be configured to monitor a plurality of electrical conditions, such as slip, stator voltage and current, rotor voltage and current, line-side voltage and current, DC-link charge and/or any other electrical condition of the power generating asset.

In an embodiment, the power generating asset may be communicatively coupled to at least one grid sensor 158. The grid sensor(s) 158 may be configured to monitor at least one parameter of the power of the power grid 179 and/or a power output of the power generating asset 100 delivered to the power grid 179. For example, the operational sensor(s) 158 may be configured to continuously monitor the voltage of the power grid 179 as seen by the power generating asset 100 and vice versa. The grid sensor(s) 158 may, for example, be configured to gather data indicative of the phase angle of the grid voltage. Accordingly, the operational sensor(s) 158 may, in an embodiment, be an ammeter, a voltmeter, an ohmmeter, and/or any other suitable sensor for monitoring the power of the power grid 179 and/or the power output of the power generating asset 100.

It should also be appreciated that, as used herein, the term "monitor" and variations thereof indicates that the various sensors of the power generating asset 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the power generating asset 100.

Figure 4:
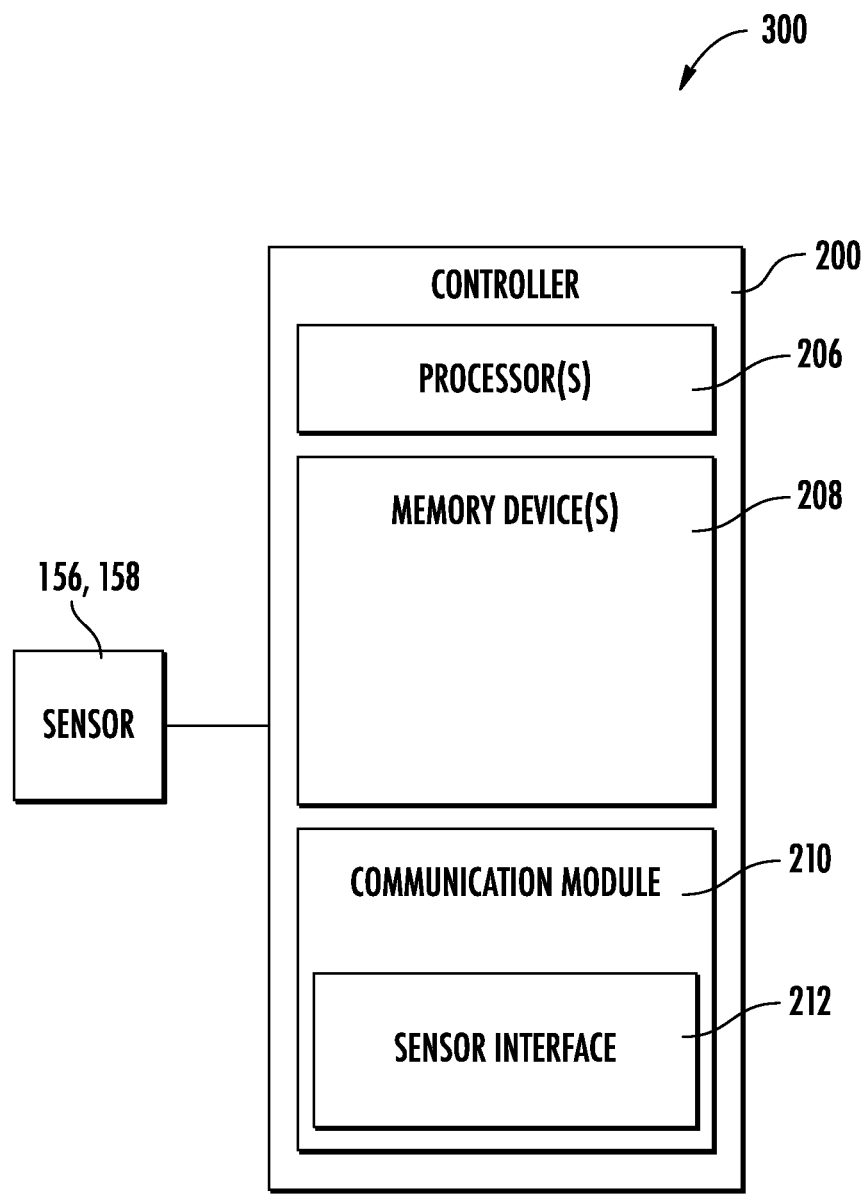
FIG. 4 illustrates a block diagram of one embodiment of a controller for use with the power generating asset according to the present disclosure.
Figure 5:
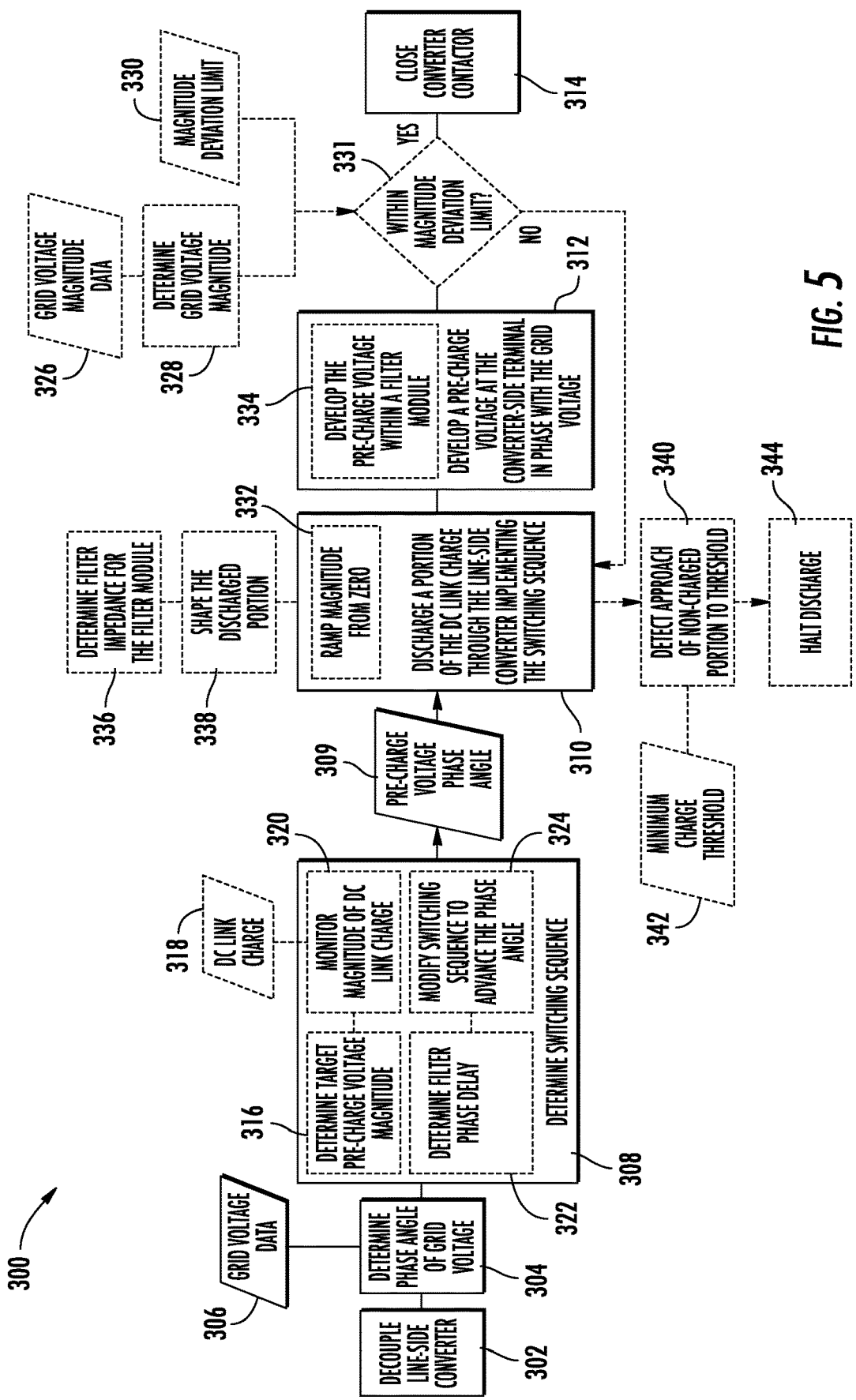
FIG. 5 illustrates a flow diagram of one embodiment of a control logic of a system for operating the power generating asset according to the present disclosure.

Referring to FIGS. 4 and 5, multiple embodiments of a system 300 for controlling the power generating asset 100 according to the present disclosure are presented. As shown particularly in FIG. 4, a schematic diagram of one embodiment of suitable components that may be included within the system 300 is illustrated. For example, as shown, the system 300 may include the controller 200 communicatively coupled to the sensor(s) 156, 158. Further, as shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the power generating asset 100. Further, the communications module 210 may include a sensor interface 212 (e.g., one or more analog-to-digital converters) to permit signals transmitted from the sensor(s) 156, 158 to be converted into signals that can be understood and processed by the processors 206. It should be appreciated that the sensor(s) 156, 158 may be communicatively coupled to the communications module 210 using any suitable means. For example, the sensor(s) 156, 158 may be coupled to the sensor interface 212 via a wired connection. However, in other embodiments, the sensor(s) 156, 158 may be coupled to the sensor interface 212 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, determining a switching sequence for a plurality of switching devices 438 of the line-side converter 414 which is configured to develop a pre-charge voltage phase angle at the converter-side terminal(s) 444 of the converter contactor 440 as described herein, as well as various other suitable computer-implemented functions.

As depicted at 302 in FIG. 5, in an embodiment, employing the system 300 to operate the power generating asset 100 in accordance with the present disclosure may include decoupling the line-side converter 414 from the power grid 179. For example, in response to the parking and/or idling of the power generating asset 100, the converter contactor 440 may be transitioned to an open operating state in order to electrically decouple the line-side converter 414, and thus the power converter 408, from the power grid 179. The transitioning of the converter contactor 440 to the open configuration may be accomplished by separating the contacts of the converter contactor 440 in order to break the conductive connection therebetween. In such a configuration, the grid-side terminal(s) 442 may remain electrically coupled to the power grid 179 and therefore remain energized while the converter-side terminal(s) 444 may be deenergized.

In an embodiment, the controller 200 of the system 300 may be configured to determine a phase angle 304 of the grid voltage. For example, in an embodiment, the controller 200 may be configured to receive grid voltage data 306 from the grid sensor 158. In an embodiment, the grid sensor 158 may be an element of, or coupled to, a phase locked loop module 458 of the electrical system 400. Based on the determined phase angle 304, the controller 200 may determine a switching sequence 308 for the plurality of switching devices 438 of the line-side converter 414. In an embodiment, the switching sequence 308 may be configured to develop a pre-charge voltage phase angle 309 at the converter-side terminal(s) 444 of the converter contactor 440. Following the determination of the switching sequence 308, the system 300 may discharge a portion 310 of a DC-link charge 318 through the line-side converter 314 implementing the switching sequence 308 so as to develop a pre-charge voltage 312 having the pre-charge voltage phase angle 309 at the converter-side terminal(s) 444. As such, the pre-charge voltage phase angle 309 may be in phase with the phase angle 304 of the grid voltage. In an embodiment, following the energizing of the converter-side terminal(s) 444 with the pre-charge voltage 312, the converter contactor 440 may, as depicted at 314, be closed to couple/re-couple the line-side converter 414 to the power grid 179.

It should be appreciated that, in an embodiment, prior to the closing of the converter contactor 440, the grid-side terminal(s) 442 of the converter contactor 440 may be energized by the grid voltage from the power grid 179. Accordingly, energizing the converter-side terminal(s) 444 with the in-phase pre-charge voltage 312 may preclude the development of an inrush current across the converter contactor 440 when the converter contactor 440 is transitioned to the closed operating state/configuration. For example, in such an embodiment, all of the contacts of the converter contactor 440 may be energized with charges having synchronized phases even when the contacts are separated from one another. Therefore, when the contacts are brought into proximity with one another the potential for arcing may be reduced/eliminated.

Referring still to FIG. 5 and again to FIG. 3, in an embodiment, the DC-link charge 318 may be established within the DC link capacitor 420 while the converter contactor 440 is in the open configuration. As such, the electrical system 400 may, in an embodiment, include a DC-link charger 456. In an embodiment, the DC-link charger 456 may be electrically coupled to the power grid 179 and/or to an auxiliary power source. For example, in an embodiment, the DC-link charger 456 may be configured as an energy storage device. When configured as an energy storage device, the DC-link charger 456 may, in an embodiment, be charged by the power generating asset 100 during power generating operations. The magnitude of the charge stored within the DC-link charger 456 may be sufficient to both generate the pre-charge voltage 312 and to maintain a threshold level of the DC-link charge 318 necessary to preclude the development of an inrush current within the DC link 418 following the coupling/re-coupling of the power converter 408 to the power grid 179.

Referring again particularly to FIG. 5, in an embodiment, the controller 200 of the system 300 may be configured to determine the switching sequence 308 which may develop the desired pre-charge voltage phase angle 309. As such, in an embodiment, the controller 200 may determine a target pre-charge voltage magnitude 316 at the converter side terminal(s) 444. The target pre-charge voltage magnitude 316 may be a percentage of the grid voltage which may preclude the development of an undesirable inrush current magnitude across the terminals 442, 444 of the converter contactor 440. Additionally, the controller 200 may be configured to monitor a magnitude 320 of the charge 318 of the DC link 418. Accordingly, the controller 200 may be configured to determine the switching sequence 308 based on the data indicative of the phase angle 304 of the grid voltage, the target pre-charge voltage magnitude 316 at the converter-side terminal(s) 444, and the magnitude 320 of the DC-link charge 318.

It should be appreciated that in an embodiment, the controller 200 may employ at least one known converter-control algorithm to determine the switching sequence 308. The converter-control algorithm may be configured to produce the desired pre-charge voltage phase angle 309 based on the phase angle 304 the grid voltage, the target pre-charge voltage magnitude 316, and the magnitude of the DC-link charge 318.

In an embodiment, the electrical system 400 may include the filter module 446. As the filter module 446 may be coupled between the converter contactor 440 and the line-side converter 314, in an embodiment, developing the pre-charge voltage 312 at the converter-side terminal(s) 444 may, as depicted at 334, include developing the pre-charge voltage 312 within the filter module 446. Developing the pre-charge voltage 312 within the filter module 446 may include charging the capacitor(s) 448 of the filter module 446. It should be appreciated that in an embodiment, developing the pre-charge voltage 312 within the filter module 446 may include passing the discharged portion 310 of the DC-link charge 318 through the distortion filter 454 and then to the filter module 446. It should further be appreciated that developing the pre-charge voltage 312 within the filter module 446 may preclude the development of an inrush current within the filter module 446, and therefore preclude voltage drops and overshoots throughout the power distribution of the power generating asset 100.

In an embodiment wherein developing the pre-charge voltage 312 at the converter-side terminal(s) 444 includes the development of the pre-charge voltage 312 within the filter module 446 and/or the distortion filter 454, the controller 200 may be configured to account for the impact of the filter module 446 and/or the distortion filter 454 on the pre-charge voltage phase angle 309. As such, in an embodiment, the controller 200 may determine a filter phase delay 322 attributable to the filter module 446 and/or the distortion filter 454. In order to compensate for the filter phase delay 322, the controller 200 may, as depicted at 324, modify the switching sequence 308 to advance the pre-charge voltage phase angle 309. For example, in such an embodiment, the switching sequence 308 may be set so that when the portion 310 of the DC-link charge 318 is discharged through the line-side converter 314, the pre-charge voltage phase angle 309 may be in advance of the phase angle 304 of the grid voltage. However, when the filter phase delay 322 impacts the pre-charge voltage 312, the resultant pre-charge voltage phase angle 309, as seen by the converter-side terminal(s) 444, may be in phase with the phase angle 304 of the grid voltage.

Referring still to FIG. 5, in an embodiment, the controller 200 may be configured to receive grid voltage magnitude data 326 from the grid sensor 158. Based on the magnitude data 326, the controller 200 may determine the voltage magnitude 328 of the grid voltage. The controller 200 may then determine a magnitude deviation limit 330 relative to the grid voltage magnitude 328. In an embodiment, the target pre-charge voltage magnitude 316 may be set at a value between the magnitude deviation limit 330 and the grid voltage magnitude 328. For example, in an embodiment, the target pre-charge voltage magnitude 316 may be at least 85% of the grid voltage magnitude 328. In an additional embodiment, the target pre-charge voltage magnitude 316 may be at least 85% and less than or equal to 90% of the grid voltage magnitude 328.

As depicted at 331, the controller 200 may, in an embodiment, be configured to determine whether the magnitude of the pre-charge voltage 312 is within the magnitude deviation limit 330. In an embodiment wherein the controller 200 determines that the magnitude of the pre-charge voltage 312 at the converter-side terminal(s) 444 satisfies the magnitude deviation limit 330, the controller 200 may close the converter contactor 440. However, in an embodiment wherein the controller 200 determines that the magnitude of pre-charge voltage 312 at the converter-side terminal(s) 444 falls below the magnitude deviation limit 330, an additional portion 310 of the DC link charge 318 may be discharged through the line-side converter 314.

As depicted at 332, in an embodiment, the pre-charge voltage 312 may be developed via the ramping of the pre-charge voltage 312 from a zero magnitude to a magnitude which is within the deviation limit 330 relative to the grid voltage. For example, the rate of discharge of the portion 310 of the DC-link charge 318 may be established so as to increase the magnitude of the pre-charge voltage 312 at the converter-side terminal(s) 444 over a specified time interval, as opposed to a rapid discharge of the DC link capacitor 420. It should be appreciated that ramping the pre-charge voltage 312 from a zero-magnitude may preclude the development of transient currents within the power converter 408.

In an embodiment, the controller 200 may be configured to monitor a magnitude of the portion 310 of the DC-link charge 318 passed through the line-side converter 314. Accordingly, the controller 200 may be configured to utilize at least the monitored magnitude to calculate the magnitude of the pre-charge voltage 312 at the converter-side terminal(s) 444.

In an embodiment wherein the filter module 446 may be disposed between the line-side converter 314 and the converter contactor 440, the controller 200 may be configured to determine a filter impedance 336 for the filter module 446. In order to account for the filter impedance 336, the discharged portion 310 of the DC link charge 318 may, as depicted at 338, be shaped. The shaping of the discharged portion 310 may, in an embodiment, result in the pre-charge voltage 312 at the converter-side terminal 444 being in phase with the grid voltage and within the magnitude deviation limit 330.

Referring still to FIG. 5, in an embodiment, the controller 200 may be configured to monitor a non-discharged portion 340 of the DC-link charge 318. In other words, the controller 200 may, in an embodiment, receive an indication from the operational sensor(s) 156 of the charge remaining within the DC link capacitor 420 during the discharging of the portion 310. Accordingly, the controller 200 may, in an embodiment, detect an approach of the non-discharged portion 340 to a minimum charge threshold 342. The minimum charge threshold 342 may represent the threshold level of the DC-link charge 318 necessary to preclude the development of an inrush current within the DC link 418 following the coupling/re-coupling of the power converter 408 to the power grid 179. As depicted at 344, in an embodiment wherein the non-discharged portion 340 of the DC link charge 318 falls below the minimum charge threshold 342, the discharging of the portion 310 of the DC-link charge 318 may be halted.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for operating a power generating asset electrically coupled to a power grid, the power generating asset comprising a power converter having a line-side converter operably coupled to the power grid via a converter contactor, the method comprising: decoupling the line-side converter from the power grid; determining, via a controller, a phase angle of a grid voltage of the power grid; determining, via the controller, a switching sequence for a plurality of switching devices of the line-side converter, the switching sequence being configured to develop a pre-charge voltage phase angle at a converter-side terminal of the converter contactor; discharging a portion of a charge of a DC link (DC-link charge) through the line-side converter implementing the switching sequence so as to develop a pre-charge voltage having the pre-charge voltage phase angle at the converter-side terminal, wherein the pre-charge voltage phase angle is in phase with the phase angle of the grid voltage; and closing the converter contactor so as to recouple the line-side converter to the power grid.

Clause 2. The method of clause 1, wherein the converter contactor further comprises a grid-side terminal energized by the grid voltage, and wherein developing the pre-charge voltage energizes the converter-side terminal so as to preclude an inrush current across the converter contactor when closed.

Clause 3. The method of any preceding clause, wherein developing the pre-charge voltage at the converter-side terminal further comprises developing the pre-charge voltage within a filter module coupled between the line-side converter and the converter contactor.

Clause 4. The method of any preceding clause, wherein determining the phase angle of the grid voltage comprises receiving data indicative of the phase angle of the grid voltage from a phase locked loop module, and wherein determining the switching sequence further comprises: determining, via the controller, a target pre-charge voltage magnitude at the converter-side terminal; monitoring, via the controller, a magnitude of the charge of the DC link; and determining, via the controller, the switching sequence based on the data indicative of the phase angle of the grid voltage, the target pre-charge voltage magnitude at the converter-side terminal, and the magnitude of the charge of the DC link.

Clause 5. The method of any preceding clause, wherein determining the switching sequence further comprises: determining, via the controller, a filter phase delay for the filter module; and modifying the switching sequence to advance the phase angle of the pre-charge voltage to compensate for the filter phase delay.

Clause 6. The method of any preceding clause, wherein the plurality of switching devices of the line-side converter comprise a three pairs of diodes and three pairs of insulated-gate bipolar transistors.

Clause 7. The method of any preceding clause, wherein developing the pre-charge voltage at the converter-side terminal further comprises: determining, via the controller, a voltage magnitude of the grid voltage; and developing a pre-charge voltage via a ramping of the pre-charge voltage from a zero magnitude to a magnitude which is within a deviation limit relative to the grid voltage.

Clause 8. The method of any preceding clause, wherein ramping the pre-charge voltage magnitude comprises developing the pre-charge voltage which is at least 85% of the voltage magnitude of the grid voltage.

Clause 9. The method of any preceding clause, wherein developing the pre-charge voltage further comprises: monitoring, via the controller, a magnitude of the portion of the DC-link charge passed through the line-side converter; and calculating, via the controller, the pre-charge voltage magnitude at the converter-side terminal based, at least in part, on the monitored magnitude of the portion of the DC-link charge passed through the line-side converter.

Clause 10. The method of any preceding clause, wherein developing the pre-charge voltage at the converter-side terminal further comprises: determining, via the controller, a filter impedance for a filter module disposed between the line-side converter and the converter contactor; and clause shaping the discharged portion of the DC-link charge based, at least in part, on the filter impedance so as to develop the pre-charge voltage at converter-side terminal that is in phase with the grid voltage and within the deviation limit.

Clause 11. The method of any preceding clause, wherein the power converter further comprises a distortion filter operably coupling the filter module to the line-side converter, and wherein the portion of the DC-link charge discharged through the line-side converter is passed through the distortion filter and then to the filter module.

Clause 12. The method of any preceding clause, further comprising: monitoring, via the controller, a non-discharged portion of the DC-link charge retained by a DC link of the power converter; detecting, via the controller, an approach of the non-discharged portion to a minimum charge threshold; and halting the discharging of the portion of the DC-link charge when the non-discharged portion is below the minimum charge threshold.

Clause 13. The method of any preceding clause, wherein the decoupling of the line-side converter is accomplished in response to at least one of a parking or idling of the power generating asset.

Clause 14. A system for operating a power generating asset, the system comprising: a power converter having a line-side converter operably coupled to a power grid via a converter contactor; and a controller communicatively coupled to the power converter, the controller comprising at least one processor configured to perform a plurality of operations, the plurality of operations comprising: decoupling the line-side converter from the power grid, determining a phase angle of a grid voltage of the power grid, determining a switching sequence for a plurality of switching devices of the line-side converter, the switching sequence being configured to develop a pre-charge voltage phase angle at a converter-side terminal of the converter contactor, discharging a portion of a charge of the DC link through the line-side converter implementing the switching sequence so as to develop a pre-charge voltage having the pre-charge voltage phase angle at the converter-side terminal, wherein the pre-charge voltage phase angle is in phase with the phase angle of the grid voltage, and closing the converter contactor so as to recouple the line side converter to the power grid.

Clause 15. The system of any preceding clause, wherein the converter contactor further comprises a grid-side terminal energized by the grid voltage, and wherein developing the pre-charge voltage energizes the converter-side terminal so as to preclude an inrush current across the converter contactor when closed.

Clause 16. The system of any preceding clause, wherein developing the pre-charge voltage at the line-side terminal further comprises developing the pre-charge voltage within a filter module coupled between the line-side converter and the converter contactor.

Clause 17. The system of any preceding clause, wherein determining the phase angle of the grid voltage comprises receiving data indicative of the phase angle of the grid voltage from a phase locked loop module, and wherein determining the switching sequence further comprises: determining a target pre-charge voltage magnitude at the converter-side terminal; monitoring a magnitude of the charge of the DC link; and determining the switching sequence based on the data indicative of the phase angle of the grid voltage, the pre-charge voltage magnitude at the converter-side terminal, and the magnitude of the charge of the DC link.

Clause 18. The system of any preceding clause, wherein determining the switching sequence further comprises: determining a filter phase delay for the filter module; and modifying the switching sequence to advance the phase angle of the pre-charge voltage to compensate for the filter phase delay.

Clause 19. The system of any preceding clause, wherein developing the pre-charge voltage at the converter-side terminal further comprises: determining a voltage magnitude of the grid voltage; and developing the pre-charge voltage which is at least 85% of the voltage magnitude of the grid voltage.

Clause 20. The system of any preceding clause, wherein developing the pre-charge voltage magnitude further comprises: monitoring a magnitude of the portion of the DC-link charge passed through the line-side converter; calculating the pre-charge voltage magnitude at the converter-side terminal, at least in part, on the monitored magnitude of the portion of the DC-link charge passed through the line-side converter; determining a filter impedance for a filter module disposed between the line-side converter and the converter contactor; and shaping the discharged portion of the DC-link charge based, at least in part, on the filter impedance so as to develop the pre-charge voltage at converter-side terminal that is in phase with the grid voltage and within 85% of the voltage magnitude of the grid voltage.

What is claimed is:

1. A method for operating a power generating asset electrically coupled to a power grid, the power generating asset comprising a power converter having a line-side converter operably coupled to the power grid via a converter contactor, the method comprising:
   decoupling the line-side converter from the power grid;
   determining, via a controller, a phase angle of a grid voltage of the power grid;
   determining, via the controller, a switching sequence for a plurality of switching devices of the line-side converter, the switching sequence being configured to develop a pre-charge voltage phase angle at a converter-side terminal of the converter contactor;
   discharging a portion of a charge of a DC link (DC-link charge) through the line-side converter implementing the switching sequence so as to develop a pre-charge voltage having the pre-charge voltage phase angle at the converter-side terminal, wherein the pre-charge voltage phase angle is in phase with the phase angle of the grid voltage; and
   closing the converter contactor so as to recouple the line-side converter to the power grid.

2. The method of claim 1, wherein the converter contactor further comprises a grid-side terminal energized by the grid voltage, and wherein developing the pre-charge voltage energizes the converter-side terminal so as to preclude an inrush current across the converter contactor when closed.

3. The method of claim 1, wherein developing the pre-charge voltage at the converter-side terminal further comprises developing the pre-charge voltage within a filter module coupled between the line-side converter and the converter contactor.

4. The method of claim 3, wherein determining the phase angle of the grid voltage comprises receiving data indicative of the phase angle of the grid voltage from a phase locked loop module, and wherein determining the switching sequence further comprises:
   determining, via the controller, a target pre-charge voltage magnitude at the converter-side terminal;
   monitoring, via the controller, a magnitude of the charge of the DC link; and
   determining, via the controller, the switching sequence based on the data indicative of the phase angle of the grid voltage, the target pre-charge voltage magnitude at the converter-side terminal, and the magnitude of the charge of the DC link.

5. The method of claim 4, wherein determining the switching sequence further comprises:
   determining, via the controller, a filter phase delay for the filter module; and
   modifying the switching sequence to advance the phase angle of the pre-charge voltage to compensate for the filter phase delay.

6. The method of claim 4, wherein the plurality of switching devices of the line-side converter comprises three pairs of diodes and three pairs of insulated-gate bipolar transistors.

7. The method of claim 1, wherein developing the pre-charge voltage at the converter-side terminal further comprises:
  determining, via the controller, a voltage magnitude of the grid voltage; and
  developing a pre-charge voltage via a ramping of the pre-charge voltage from a zero magnitude to a magnitude which is within a deviation limit relative to the grid voltage.

8. The method of claim 7, wherein ramping the pre-charge voltage magnitude comprises developing the pre-charge voltage which is at least 85% of the voltage magnitude of the grid voltage.

9. The method of claim 7, wherein developing the pre-charge voltage further comprises:
  monitoring, via the controller, a magnitude of the portion of the DC-link charge passed through the line-side converter; and
  calculating, via the controller, the pre-charge voltage magnitude at the converter-side terminal based, at least in part, on the monitored magnitude of the portion of the DC-link charge passed through the line-side converter.

10. The method of claim 9, wherein developing the pre-charge voltage at the converter-side terminal further comprises:
  determining, via the controller, a filter impedance for a filter module disposed between the line-side converter and the converter contactor; and
  shaping the discharged portion of the DC-link charge based, at least in part, on the filter impedance so as to develop the pre-charge voltage at converter-side terminal that is in phase with the grid voltage and within the deviation limit.

11. The method of claim 10, wherein the power converter further comprises a distortion filter operably coupling the filter module to the line-side converter, and wherein the portion of the DC-link charge discharged through the line-side converter is passed through the distortion filter and then to the filter module.

12. The method of claim 1, further comprising:
  monitoring, via the controller, a non-discharged portion of the DC-link charge retained by a DC link of the power converter;
  detecting, via the controller, an approach of the non-discharged portion to a minimum charge threshold; and
  halting the discharging of the portion of the DC-link charge when the non-discharged portion is below the minimum charge threshold.

13. The method of claim 1, wherein the decoupling of the line-side converter is accomplished in response to at least one of a parking or idling of the power generating asset.

14. A system for operating a power generating asset, the system comprising:
  a power converter having a line-side converter operably coupled to a power grid via a converter contactor; and
  a controller communicatively coupled to the power converter, the controller comprising at least one processor configured to perform a plurality of operations, the plurality of operations comprising:
    decoupling the line-side converter from the power grid,
    determining a phase angle of a grid voltage of the power grid,
    determining a switching sequence for a plurality of switching devices of the line-side converter, the switching sequence being configured to develop a pre-charge voltage phase angle at a converter-side terminal of the converter contactor,
    discharging a portion of a charge of a DC link through the line-side converter implementing the switching sequence so as to develop a pre-charge voltage having the pre-charge voltage phase angle at the converter-side terminal, wherein the pre-charge voltage phase angle is in phase with the phase angle of the grid voltage, and
    closing the converter contactor so as to recouple the line-side converter to the power grid.

15. The system of claim 14, wherein the converter contactor further comprises a grid-side terminal energized by the grid voltage, and wherein developing the pre-charge voltage energizes the converter-side terminal so as to preclude an inrush current across the converter contactor when closed.

16. The system of claim 14, wherein developing the pre-charge voltage at the converter-side terminal further comprises developing the pre-charge voltage within a filter module coupled between the line-side converter and the converter contactor.

17. The system of claim 16, wherein determining the phase angle of the grid voltage comprises receiving data indicative of the phase angle of the grid voltage from a phase locked loop module, and wherein determining the switching sequence further comprises:
  determining a target pre-charge voltage magnitude at the converter-side terminal;
  monitoring a magnitude of the charge of the DC link; and
  determining the switching sequence based on the data indicative of the phase angle of the grid voltage, the pre-charge voltage magnitude at the converter-side terminal, and the magnitude of the charge of the DC link.

18. The system of claim 17, wherein determining the switching sequence further comprises:
  determining a filter phase delay for the filter module; and
  modifying the switching sequence to advance the phase angle of the pre-charge voltage to compensate for the filter phase delay.

19. The system of claim 14, wherein developing the pre-charge voltage at the converter-side terminal further comprises:
  determining a voltage magnitude of the grid voltage; and
  developing the pre-charge voltage which is at least 85% of the voltage magnitude of the grid voltage.

20. The system of claim 19, wherein developing the pre-charge voltage magnitude further comprises:
  monitoring a magnitude of the portion of the DC-link charge passed through the line-side converter;
  calculating the pre-charge voltage magnitude at the converter-side terminal, at least in part, on the monitored magnitude of the portion of the DC-link charge passed through the line-side converter;
  determining a filter impedance for a filter module disposed between the line-side converter and the converter contactor; and
  shaping the discharged portion of the DC-link charge based, at least in part, on the filter impedance so as to develop the pre-charge voltage at converter-side terminal that is in phase with the grid voltage and within 85% of the voltage magnitude of the grid voltage.

* * * * *